(12) United States Patent
Della Corte et al.

(10) Patent No.: US 9,699,053 B2
(45) Date of Patent: *Jul. 4, 2017

(54) IT SYSTEM INFRASTRUCTURE PREDICTION BASED ON EPIDEMIOLOGIC ALGORITHM

(71) Applicant: International Business Machines Corporation, Armonk, NY (US)

(72) Inventors: Gianluca Della Corte, Rome (IT); Alessandro Donatelli, Rome (IT); Stefano Proietti, Rome (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 14/471,257

(22) Filed: Aug. 28, 2014

(65) Prior Publication Data

US 2014/0372606 A1 Dec. 18, 2014

Related U.S. Application Data

(63) Continuation of application No. 14/174,872, filed on Feb. 7, 2014, now Pat. No. 9,313,114.

(30) Foreign Application Priority Data

Apr. 9, 2013 (GB) .................................. 1306360.7

(51) Int. Cl.
*G06F 15/173* (2006.01)
*H04L 12/26* (2006.01)
(Continued)

(52) U.S. Cl.
CPC ........ *H04L 43/0876* (2013.01); *G06F 9/5072* (2013.01); *H04L 41/145* (2013.01);
(Continued)

(58) Field of Classification Search
CPC .......................... H04L 67/10; G06F 2209/5019
(Continued)

(56) References Cited

U.S. PATENT DOCUMENTS 5,684,967 A 11/1997 McKenna et al.
5,809,282 A 9/1998 Cooper et al.
(Continued)

FOREIGN PATENT DOCUMENTS

CN 102664812 A 9/2012
CN 104102810 A 10/2014

OTHER PUBLICATIONS

Nikolic et al., "On the development of Agent-Based Models for infrastructure evolution", Int. J. of Critical Infrastructures, vol. x, No. x, xxxx, Copyright 200x Inderscience Enterprises Ltd., pp. 1-19.

(Continued)

*Primary Examiner* — Bharat N Barot
(74) *Attorney, Agent, or Firm* — Samuel A. Waldbaum

(57) ABSTRACT

A computer-implemented method for prediction of required number of server computing systems for future computing workload is provided. The computer implemented method comprises connecting a portion of a plurality of server computing systems of a data center. The computer-implemented method further comprises computing at least one server computing system of each of a class I server computing system, a class S server computing system, and a class R server computing system of the plurality of the server computing systems based on a deployment rate, an undeployment rate, and a removing rate of the each of the class I server computing system, the class S server computing system, and the class R server computing system.

13 Claims, 6 Drawing Sheets

(51) Int. Cl.
*H04L 12/24* (2006.01)
*H04L 29/08* (2006.01)
*G06F 9/50* (2006.01)

(52) U.S. Cl.
CPC ........ *H04L 41/147* (2013.01); *H04L 41/5096* (2013.01); *H04L 67/10* (2013.01); *H04L 67/1008* (2013.01); *G06F 2209/5019* (2013.01); *Y02B 60/142* (2013.01); *Y02B 60/167* (2013.01)

(58) Field of Classification Search
USPC ......... 709/202–203, 223–226; 718/100–101, 718/105
See application file for complete search history.

(56) References Cited

U.S. PATENT DOCUMENTS

| | | | |
|---|---|---|---|
| 5,881,268 | A | 3/1999 | McDonald et al. |
| 6,088,718 | A | 7/2000 | Altschuler et al. |
| 6,904,449 | B1 | 6/2005 | Quinones |
| 7,290,048 | B1 | 10/2007 | Barnett et al. |
| 7,296,256 | B2 | 11/2007 | Liu et al. |
| 7,644,148 | B2 | 1/2010 | Ranganathan et al. |
| 7,739,099 | B2 | 6/2010 | Liu et al. |
| 7,984,126 | B2 | 7/2011 | McBride |
| 8,386,995 | B2 | 2/2013 | Coleman et al. |
| 8,510,745 | B2 | 8/2013 | Kimbrel et al. |
| 8,818,922 | B2 | 8/2014 | Chen et al. |
| 8,874,642 | B2 | 10/2014 | Bhagat et al. |
| 9,313,114 | B2 * | 4/2016 | Della Corte ........ H04L 41/5096 |
| 2003/0158930 | A1 | 8/2003 | Mc Bride |
| 2007/0283360 | A1 | 12/2007 | Koretz et al. |
| 2011/0060827 | A1 | 3/2011 | Corley et al. |
| 2011/0153507 | A1 | 6/2011 | Murthy et al. |
| 2012/0222039 | A1 | 8/2012 | Bavaria et al. |
| 2012/0265881 | A1 | 10/2012 | Chen et al. |
| 2014/0372606 | A1 | 12/2014 | Della Corte et al. |

OTHER PUBLICATIONS

Kim et al., "Centrality Prediction in Dynamic Human Contact Networks", Computer Laboratory, University of Cambridge, UK, pp. 1-25.
Goncalves et al., "Dynamic Resource Management in Clouds: A Probabilistic Approach", IEICE Trans. ??, vol. Exx-??, No. xxXXXX 200x, Paper Special Section on Networking Technologies for Cloud Services, The Institute of Electronics, Information and Comminication Engineers, arXiv:1209.4806v1 [cs.NI] Sep. 21, 2012, pp. 1-8.
Martcheva, "Avian Flu: Modeling and Implications for Control", AMS Subject Classification: 92D30, 92D40, Aug. 3, 2011, pp. 1-26.
Juarez et al., "A statistical, epidemiological and financial health approach to the retail trade sector in Colombia", African Journal of Business Management vol. 6, No. 16, pp. 5606-5614, Apr. 25, 2012, Available online at http://www.academicjournals.org/AJBM, DOI: 10.5897/AJBM11.1911, ISSN 1993-8233, 2012 Academic Journals.
GB Search Report for application No. GB1306360.7, search date Oct. 10, 2013, 4 pages.
Roche et al, "An Agent-Based Model to Study the Epidemiological and Evolutionary Dynamics of Influenza Viruses", BMC Bioinformatics 2011, http://www.biomedcentral.com, pp. 1-10.
Canadian Medical Association Journal, "Modelling an influenza pandemic: A guide for the perplexed", CMAJ, Aug. 4, 2009, vol. 181, No. 3-4, pp. 171-173.
Dinamica delle popolazioni Modelli di epidemie Modello per l'evoluzione della malaria, "Equazione logistica", http://dmmm.unipa.it/seminari/2009/elisa.pdf.
Pending U.S. Appl. No. 14/174,872, entitled "IT System Infrastructure Prediction Based on Epidemiologic Algorithm", filed on Feb. 7, 2014.
Abandoned GB application 1306360.7, entitled "IT infrastructure prediction based on epidemiologic algorithm", filed on Apr. 9, 2013.

* cited by examiner

US 9,699,053 B2

IT SYSTEM INFRASTRUCTURE PREDICTION BASED ON EPIDEMIOLOGIC ALGORITHM

CROSS REFERENCE

The present application is a continuation of and claims priority under 35 U.S.C. §120 of U.S. patent application Ser. No. 14/174,872, filed on Feb. 7, 2014, which is incorporated by reference in its entirety.

FIELD OF THE INVENTION

The present invention relates generally to a computer-implemented method for a prediction of a required number of servers for a future computing workload. The present invention further relates to a prediction system for a prediction of a required number of servers for a future computing workload, a computing system, a data processing program, and a computer program product.

BACKGROUND

Modern data centers typically change their operating parameters over time. The change can be based on current or future workload operational changes, including, for example, distribution of workload changes among different architectures of the data centers. Information technology infrastructure (IT) systems of data centers also change over time in terms of geographical expansion, or operational reductions of the IT systems. Further, it can be difficult to predict how an IT system changes over time. It can also be difficult to take preventive actions to accommodate evolution of changes of certain IT systems. For example, in a cloud computing virtual environment, demand for certain workloads may change in large ranges. As such, in order to guarantee a stable operating computing environment, it is useful for operators of data centers to have an understanding of future workload requirements of data centers. Therefore, there is a need to have insights about future workloads changes of data centers. This need can include a need to predict future life cycles of applications of the data centers.

SUMMARY

In one embodiment, a computer-implemented method for prediction of required number of server computing systems for future computing workload is provided. The computer-implemented method comprises connecting, by one or more processors, a portion of a plurality of server computing systems of a data center, wherein the connected plurality of server computing systems are connected within a network. The computer-implemented method further comprises determining, by the one or more processors, at least one class S server computing system of the plurality of server computing systems, wherein the at least one class S server computing system is adapted to deploy an application of the plurality of server computing systems. The computer-implemented method further comprises determining, by the one or more processors, at least one class I server computing system of the plurality of server computing systems, wherein the at least one class I server is adapted to deploy an application of the plurality of server computing systems. The computer-implemented method further comprises determining, by the one or more processors, at least one class R server computing system of the plurality of server computing systems. The computer-implemented method further comprises computing, by the one or more processors, at least one server computing system of each of the class I server computing system, class S server computing system, and class R server computing system based on a deployment rate, an undeployment rate, and a removing rate, wherein the deployment rate indicates at least one class S server computing system of the class S server computing systems that is transferred from the class S server computing systems to the class I server computing systems within a predefined time period, wherein the undeployment rate indicates at least one class I server computing system of the class I server computing systems that is transferred from the class I server computing systems to the class S server computing systems within a predefined time period, and wherein the removing rate indicates at least one class I server computing system of the class I server computing systems that is transferred from the class I server computing system to the class R server computing system in a predefined time period.

In another embodiment, a computer system for prediction of required number of server computing systems for future computing workload is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to connect a portion of a plurality of server computing systems of a data center, wherein the connected plurality of server computing systems are connected within a network. The computer system further comprises program instructions to determine at least one class S server computing system of the plurality of server computing systems, wherein the at least one class S server computing system is adapted to deploy an application of the plurality of server computing systems. The computer system further comprises program instructions to determine at least one class I server computing system of the plurality of server computing systems, wherein the at least one class I server is adapted to deploy an application of the plurality of server computing systems. The computer system further comprises program instructions to determine at least one class R server computing system of the plurality of server computing systems. The computer system further comprises program instructions to compute at least one server computing system of each of the class I server computing system, class S server computing system, and class R server computing system based on a deployment rate, an undeployment rate, and a removing rate, wherein the deployment rate indicates at least one class S server computing system of the class S server computing systems that is transferred from the class S server computing systems to the class I server computing systems within a predefined time period, wherein the undeployment rate indicates at least one class I server computing system of the class I server computing systems that is transferred from the class I server computing systems to the class S server computing systems within a predefined time period, and wherein the removing rate indicates at least one class I server computing system of the class I server computing systems that is transferred from the class I server computing system to the class R server computing system in a predefined time period.

In yet another embodiment, a computer program product for prediction of required number of server computing systems for future computing workload is provided. The computer program product comprises one or more computer-readable tangible storage devices and program instructions stored on at least one of the one or more storage devices. The computer program product further comprises program instructions to connect a portion of a plurality of server computing systems of a data center, wherein the connected plurality of server computing systems are connected within a network. The computer program product further comprises program instructions to determine at least one class S server computing system of the plurality of server computing systems, wherein the at least one class S server computing system is adapted to deploy an application of the plurality of server computing systems. The computer program product further comprises program instructions to determine at least one class I server computing system of the plurality of server computing systems, wherein the at least one class I server is adapted to deploy an application of the plurality of server computing systems. The computer program product further comprises program instructions to determine at least one class R server computing system of the plurality of server computing systems. The computer program product further comprises program instructions to compute at least one server computing system of each of the class I server computing system, class S server computing system, and class R server computing system based on a deployment rate, an undeployment rate, and a removing rate, wherein the deployment rate indicates at least one class S server computing system of the class S server computing systems that is transferred from the class S server computing systems to the class I server computing systems within a predefined time period, wherein the undeployment rate indicates at least one class I server computing system of the class I server computing systems that is transferred from the class I server computing systems to the class S server computing systems within a predefined time period, and wherein the removing rate indicates at least one class I server computing system of the class I server computing systems that is transferred from the class I server computing system to the class R server computing system in a predefined time period.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
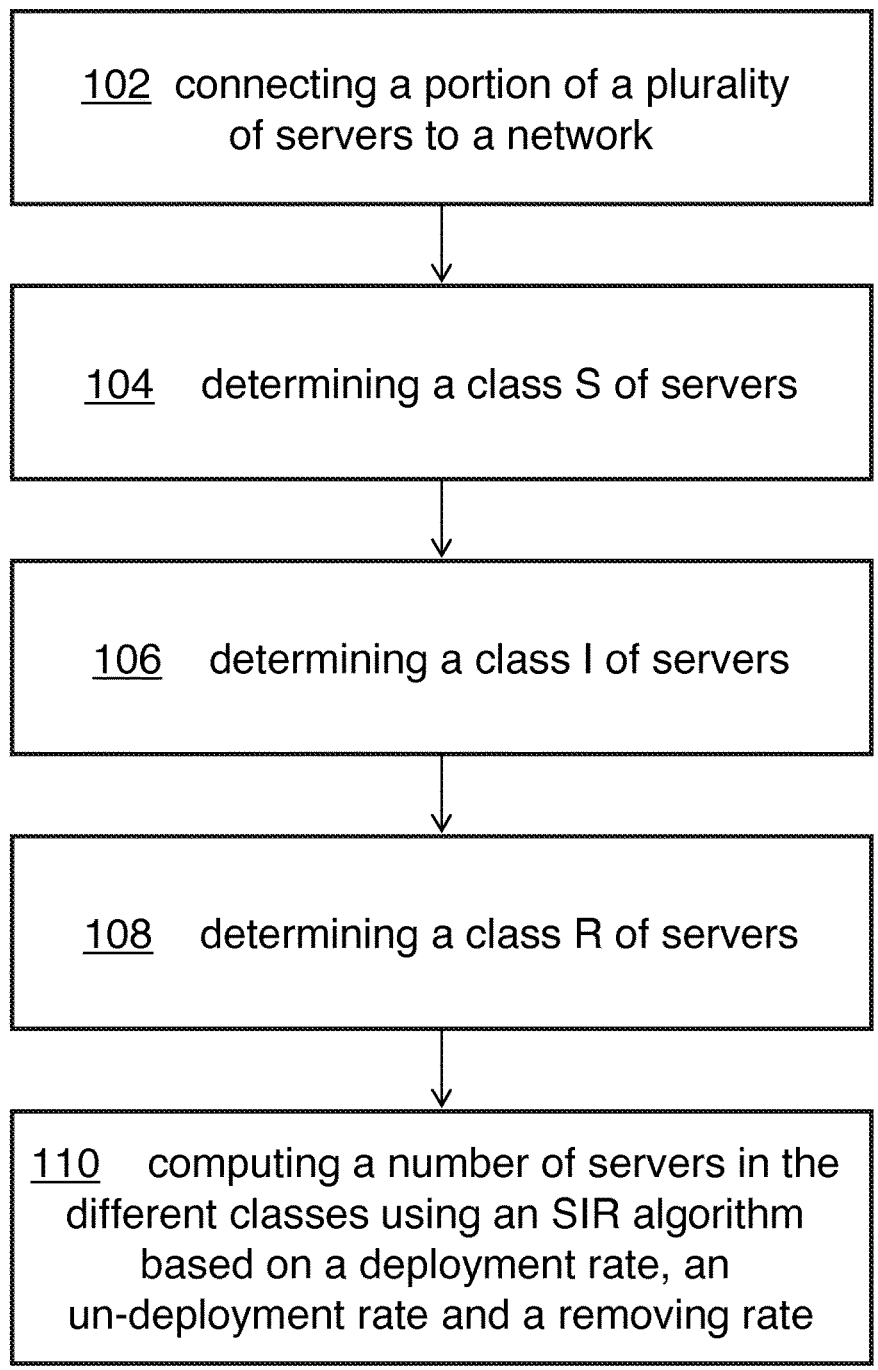
FIG. 1 shows a block diagram of an embodiment of the inventive method.

In the following, a detailed description of the figures will be given. All instructions in the figures are schematic. Firstly, a block diagram of an embodiment of the inventive computer-implemented method for a prediction of a required number of servers for a future computing workload is given. Afterwards, aspects of the prediction system for a prediction of a required number of servers for a future computing workload are given. Afterwards, aspects of the prediction system for a prediction of a required number of servers for a future computing workload will be described. According to aspects of the present invention, the term "prediction" may denote a process of forecasting a future status of, e.g., a network topology, number of servers connected to the network, number of servers running an application or just being able to run the application, and the like. A prediction may also be seen as an assumed future status. The term "future computing workload" may denote a workload on one or more servers that may be required at a point in time in the future. The term "server" may denote a computing device being connectable to a data network connecting a plurality of servers.

Any computing device may function as a node in the network. The term "class S server" may denote a server being able to run a specific predefined application. The server may qualify due to its characteristics to run the application. However, "class S" only means that the server may be able to run the application but does not actually run the application. The term "class I server" may denote a server actually running a specific predefined application. A class I server is not only able to run the application but actually deploys the application. The term "class R server" may denote a server that is not connected to the network. However, the server may also be able to run the application in principle. Prerequisites for this may be a connection to the network and a loading of the application. The term "deploy" may denote that an application is run on a computer or server. The term "disconnected" may denote a status of a server in which the server may not be connected to the network. However, these servers may actually also be related—instead of connected—to the network because they may be connected instantly. The term "Susceptible-Infected-Recovered-Algorithm" (SIR algorithm) may denote an algorithm in an epidemic model. The SIR model may be a specific epidemic model based on infected individuals. S may denote the number of people not yet being infected by a disease. I may denote the number of people being infected. And R may denote the number of people who have been infected and then recovered from the disease. The SIR algorithm may predict the number of people in the different classes.

The term "deployment rate" may denote a number of servers leaving the class S of servers and join the class I of servers in a period of time. This means that the servers are not only adapted to run the application but actually run the application and serve users. The term "un-deployment rate" may denote a number of servers going the reverse way: leaving the class I of servers and join the class S of servers in a period of time. The term removing rate may denote a number of servers getting disconnected from the computer network such that they no longer may contribute to handle the workload in the network regarding the applications. The term "connection number" may denote active servers, i.e., a number of servers connected to the network. These servers may be of class S and I. The term "active servers" may denote the sum of servers in class S and class I. Disconnected servers may be counted as active servers. The term "evolution index" may denote an expectation or assumption index about future workloads requirements. The term "prediction system" may denote a system with different components being able to perform a prediction for a topology of a network of computers, and more specifically, the number of servers required for future workloads. The term "connection unit" may, in one embodiment, denote one or more network hubs or switches or the like being adapted to establish a connection between at least two computers. The term "S class storage unit" may denote a computer memory adapted to store a number indicative of a number of S class servers in the network. The term "I class storage unit" may denote a computer memory adapted to store a number indicative of a number of I class servers in the network. And, the term "R class storage unit" may denote a computer memory adapted to store a number indicative of a number of R class servers in the network.

The proposed computer-implemented method for a prediction of a required number of servers for a future computing workload may offer a couple of advantages: As computing power becomes more and more a commodity, data centers are increasingly under enormous cost pressure. It may economically not be feasible to install and keep available a much higher computing power than required at a certain point in time. On the other side, it takes some time to install and deploy new servers being able to run an application and serve a certain number of users. In a simplified way, a workload may be seen as an equivalent of running a specific application for a predefined number of users with a predefined user profile. Thus, a data center operator may be in the dilemma of having not enough or too many servers available to run the application. The usage of Cloud computing technologies, Software-as-a-Service and the like models available, make a predictability based on heuristic methods even more uncertain. The proposed computer-implemented method for a prediction of a number of servers at a point in time in the future under changing workload conditions may contribute to optimize the operations of a data center. The ability to predict a number of servers at a point in time in the future may make resource planning in a data center more reliable and may avoid performance bottlenecks. Response times of the applications for users, operating expenses, support personal, power requirements and the like may be optimized for running a data center in a much smarter way.

The proposed inventive concept may also be applied to virtual machines and/or other components in a data center like network elements, storage devices and the like. According to one embodiment of the method, a current number of servers in the different classes S, I, and R in the data center may be determined by $S_0(t_0)$ as the number of servers in class S at time $t_0$, $I_0(t_0)$ as the number of servers in class I at time $t_0$, and $R_0(t_0)$ as the number of servers in class R at time $t_0$. $t_0$ may be the starting point of the method for predicting the number of servers in the different classes at a point in time in the future. A starting point may be required for a functioning algorithm.

According to one more embodiment of the method, the deployment rate may depend at least on a connection number indicative of a number of active servers in the network. The number of active servers may be understood as the servers in class S and I, thus, also those servers being connected to the network. These servers may actually be able to execute the workload and serve user requirements in terms of computing power and processing the application. Non-connected servers do not count to the number of active servers because they are not able to contribute to the requirements of running the application and serve users. According to an advance embodiment of the method, the deployment rate may further depend on an evolution index indicative of a probability of an increasing demand for the application and active servers. An increased demand may have several root causes: More users may have a need for using the application, the same or a smaller number of users may use the application more intensively, i.e., more often, the functionality of the application may change over time requiring more computing power, more users of the application may use the application for different application areas, and the like—just to name a few possibilities. It may be assumed that a more intensive business environment may lead to a higher demand for the application. However, as the above examples show, also a more intensive usage of fewer users of the application may lead to an increased workload demand.

However, the higher economic activity may also be a reason for an increased workload demand leading to a higher number of servers required in the network to run the application to support more users. The higher demand may apply only to one data center or one region the data center may serve. Thus, the inventive concept may also be applicable to virtual data centers that may be spread over different geographical locations and be managed under one central data center management.

According to one enhanced embodiment of the method, a development over time for the number of servers in the classes S, I, R may be calculated according to $(d/dt)S(t) = -\lambda(t)*S(t) + \delta(t)*I(t)$, $(d/dt)I(t) = \lambda(t)*S(t) + (\gamma(t) + \delta(t))*I(t))$, and $(d/dt)R(t) = \gamma(t)*I(t)$, wherein
  $\lambda(t)$ is the deployment rate,
  $\delta(t)$ is the un-deployment rate, and
  $\gamma(t)$ is the removing rate.

The term (d/dt) may be understood mathematically as the first deviation. The deployment rate, the un-deployment rate and the removing rate may all be time dependent. As a solution method to the set of equations, the Euler method may be used. It allows to solve the set of equations and determine a number of servers in the classes S, I, and R under the given parameter functions $\lambda(t)$, $\delta(t)$, and $\gamma(t)$.

The deployment rate $\lambda(t)$ may be calculated according to $\lambda(t) = c*(I)*(I(t)/P(t_0))$, wherein c is the connection index, $\Phi$ is the evolution index, and $P(t_0)$ is the total number of servers at time $t_0$.

The evolution index $\Phi(t)$ may be calculated according to $\Phi(t) = I(t)/P(t_0)$.

With these and the other formulas, a closed set of equations may be available that may be solved with known techniques like the Euler method.

According to one more embodiment of the method, the increasing demand for the application and thus, active servers may be based on at least one of the following: workload data from a system monitoring tool, collected user demand data for the application, and/or an economic index. An economic index may finally lead to more business activities, and thus a higher demand for the IT resources, e.g., more users need the applications. However, as explained above, not only more users may lead to a higher workload. Also a smaller number of users may handle a higher business demand by a more intensive usage of the available IT functions, e.g., the application.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document. The aspects defined above and further aspects of the present invention are apparent from the examples of embodiments to be described hereinafter and are explained with reference to the examples of embodiments, but to which the invention is not limited.

FIG. 1 shows a block diagram of an embodiment of the computer-implemented method for a prediction of a required number of servers for a future computing workload. The method may comprise connecting, 102, a portion of a plurality of servers, i.e., computing servers or computers acting as servers to each other such that they may build a computer network. The network may have a certain topology. The network may be located in one physical data center. Alternatively, it may be a part of a virtual data center being spread over several physical locations. The method may also comprise a determination 104 of a number of class S servers out of the plurality of servers. The class S servers may be adapted to deploy an application. The application may be installed already but it may not run on the server, i.e., it may not have been started and serve users. Additionally, a determination 106 may be made to find a number of class I servers out of the plurality of servers. The class I servers may deploy, i.e., actually run the application and may serve users using functions of the application. Moreover, a determination 108 of a class R servers out of the plurality of servers may be performed. The class R servers may be disconnected from the network but remain in the data center. They may be generally available but are at a given point in time not able to support workload demand because they are not connected to the network. They are actually removed from the network. However, the servers may be used for other tasks in the data center. For the context here, a skilled person may notice that class R servers may not be available for the application. This may in one embodiment, also include the option that the servers may physically still be connected to the network but may not be available for running the application.

In a subsequent step, a number of servers out of the plurality of servers in each of the classes S, I, R may be calculated, 110, according to a Susceptible-Infected-Recovered-Algorithm being based on a deployment rate, an un-deployment rate, and a removing rate. The number of servers in the different classes may also be expressed as a probability of requiring servers in the future in the different classes.

The deployment rate may indicate a number of class S servers leaving the class S and move to the class I in a predefined time period, thus running the application instead of only be able to run the application. The un-deployment rate may indicate a number of class I servers leaving the class I and move to class S in the predefined time period. Additionally, the removing rate may indicate a number of class I servers leaving the class I and move to class R in the predefined time period, thus, they may no longer be part of the computer network. As a result, the total number of servers P(t) required in the topology of the computer network of the data center at a future time t may be calculated as $$P(t)=S(t)+I(t)+R(t), \text{ wherein}$$

S(t) may be the number of servers in class S at time t,
I(t) may be the number of servers in class I at time t,
R(t) may be the number of servers in class R at time t. "t" may be any time in the future after an initial time $t_0$.

Figure 2:
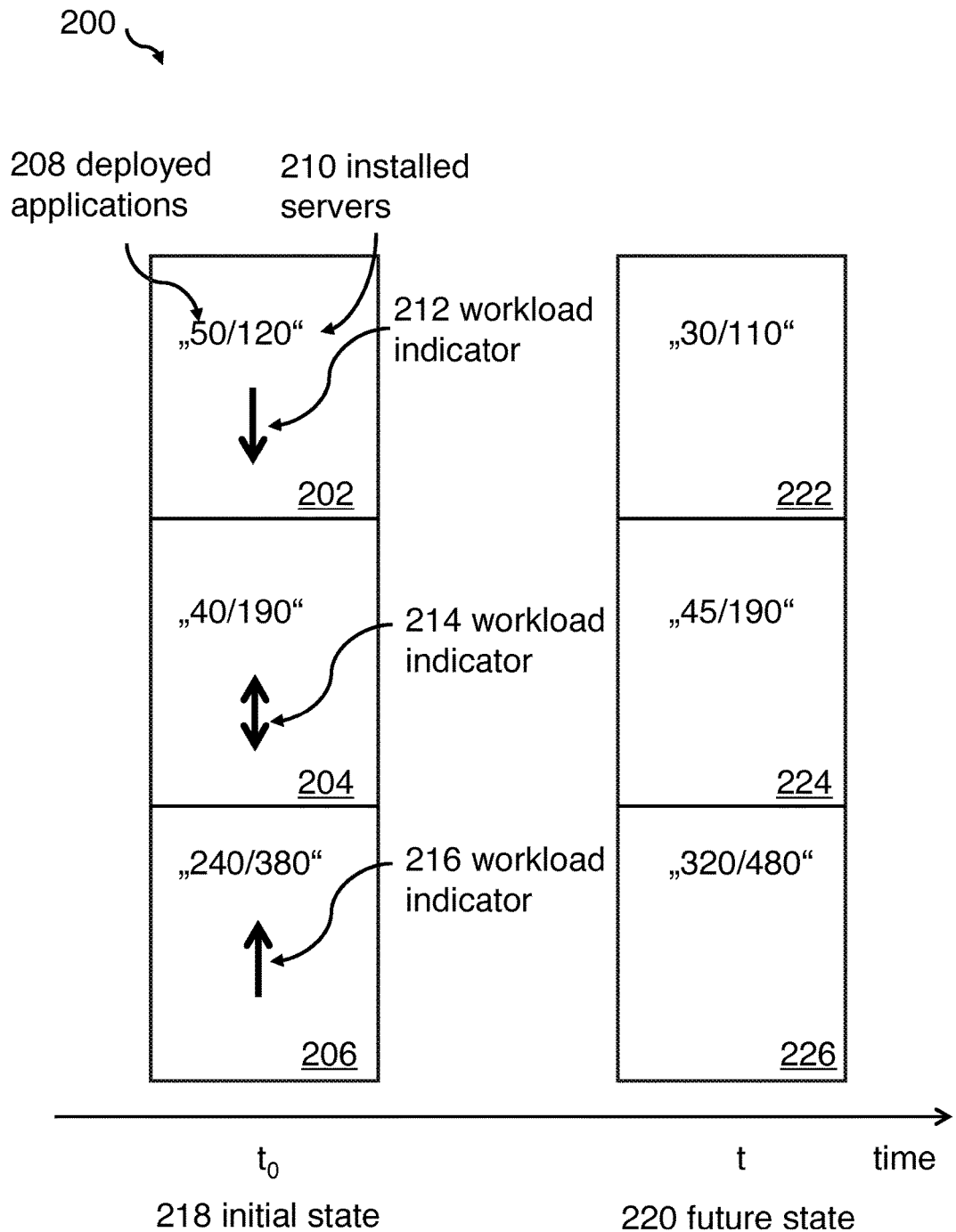
FIG. 2 shows a block diagram of an embodiment of data centers with servers at different points in time.

FIG. 2 shows a block diagram of related servers at different times, $t_0$ and t. In the initial state 218, at $t_0$, three data centers 202, 204 and 206 show different numbers in quota. The data centers 202, 204, and 206 may as well be divisions of a larger data center spanning different geographical regions. Or the reference numeral may relate to different logical departments in a larger data center responsible for different geographical or organizational areas. In one example, data center 202 may be responsible for fulfilling workload requirements for an area A, data center 204 may fulfill the workload requirements for an area B, and data center 206 may fulfill the workload requirements for an area C. The same data center may be recognizable by the reference numeral 222, 224, 226 but at a later point in time t, 220, instead of $t_0$.

The numbers in quota may indicate numbers of servers in class S and class I. Thus, in data center 202, there may be 50 servers with deployed applications and 120 installed servers. In a simple example, one installed application may be related to one server. Thus, here 70 servers (=120−70) may be able to run the application but may be idle. Servers in class R—meaning disconnected from the respective network may not be shown at all.

According to the same logic, data center 204 may have 40 servers running the application and 190 available servers in total for the application in the network. In data center 206, there may be 240 servers running the application and 380 active servers in total—meaning the sum of class S and class I servers. Moreover, an arrow may indicate a business climate as an example of an indicator of expected future workload requirements. Data center 202 shows a decreasing workload indicator 212, data center 204 shows a balanced workload indicator 214, and data center 206 shows an increasing workload indicator 216. At time t, after $t_0$ the situation in the data center may be changed. Data center 222 which is equivalent to the data center 202 at a later point in time shows 30 servers running the application and a total number of active servers of 110. Thus, the number of active servers decreased from 170 to 140. At the same time, the number of servers in class S, i.e., running the application, decreased from 50 to 30. A skilled person can interpret the other data center numbers for data centers 224 and 226. According to aspects of the present invention, the number of servers in data center 204/224 remains mainly unchanged, i.e., 40/190 vs. 45/190. In data center 206/226, the number of class S and active servers increased significantly: from 240/380 to 320/480. Here, the workload indicator, e.g., the business climate, increased, shown as "up-arrow" 216. In data center 204/224, the workload indicator may indicate a stable workload requirement by a double arrow.

Figure 3:
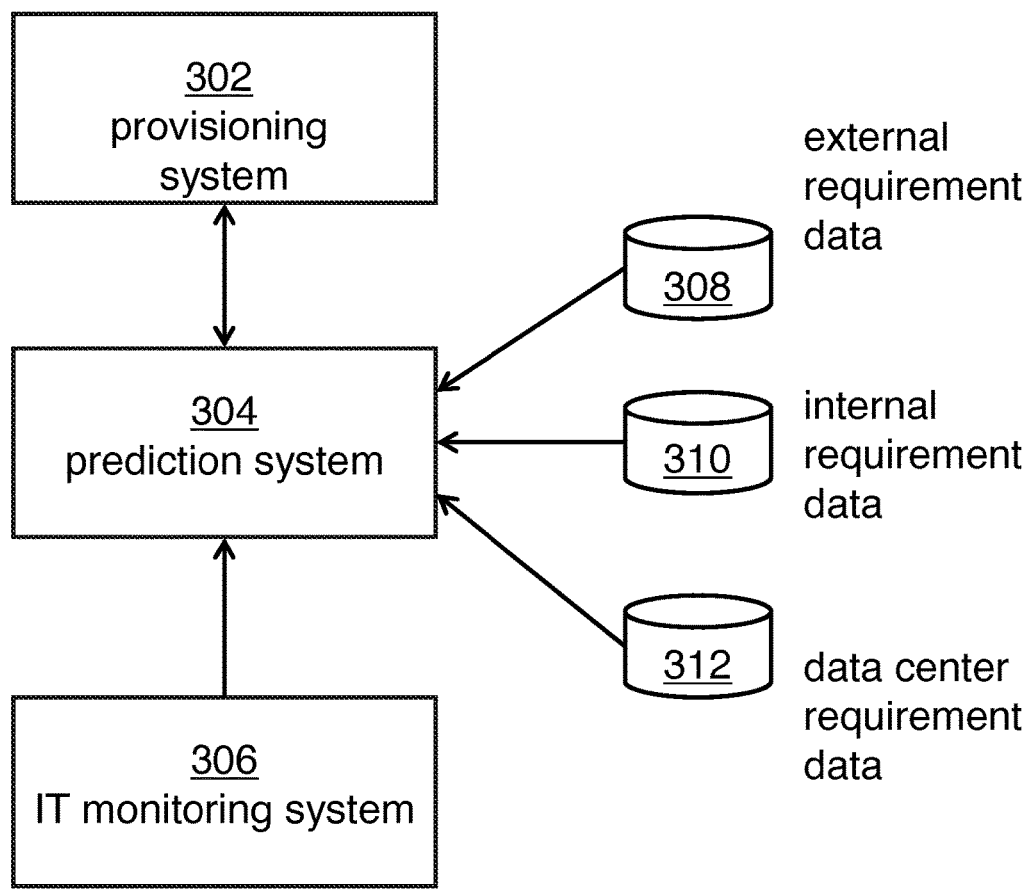
FIG. 3 shows a block diagram of components related and influencing the prediction system.

FIG. 3 shows a block diagram of an embodiment of the prediction system 304 and its related components. There may be a data exchange with an IT monitoring system 306 showing a historic overview of a development of the number of servers in the past. On the other end, the prediction system 304 may be connected to a provisioning system 302. It may be enabled to control a deployment of servers, install and run application and/or virtual machines for or with the application. The prediction system may use components of the IT monitoring system 306 to control functions of the provisioning system 302. Altogether, the prediction system 304 may be a component of a systems management tool.

Additionally, it is shown that the prediction system receives input from external requirement data sources 308, from internal requirement data sources 310, as well as data center requirement data 312. Generally speaking, the prediction system 304 may receive as much information as possible to predict future requirements of servers in classes S, I, and R. Information that have—in the past—not been used for a deployment planning. The external data may be related business climate data, a development of incoming order, revenue made in a vertical industry, a sourcing index or any other data that may serve as an indicator for a future business and thus, IT requirements in terms of computing workload. A more detailed figure of the prediction system is described in FIG. 4.

Figure 4:
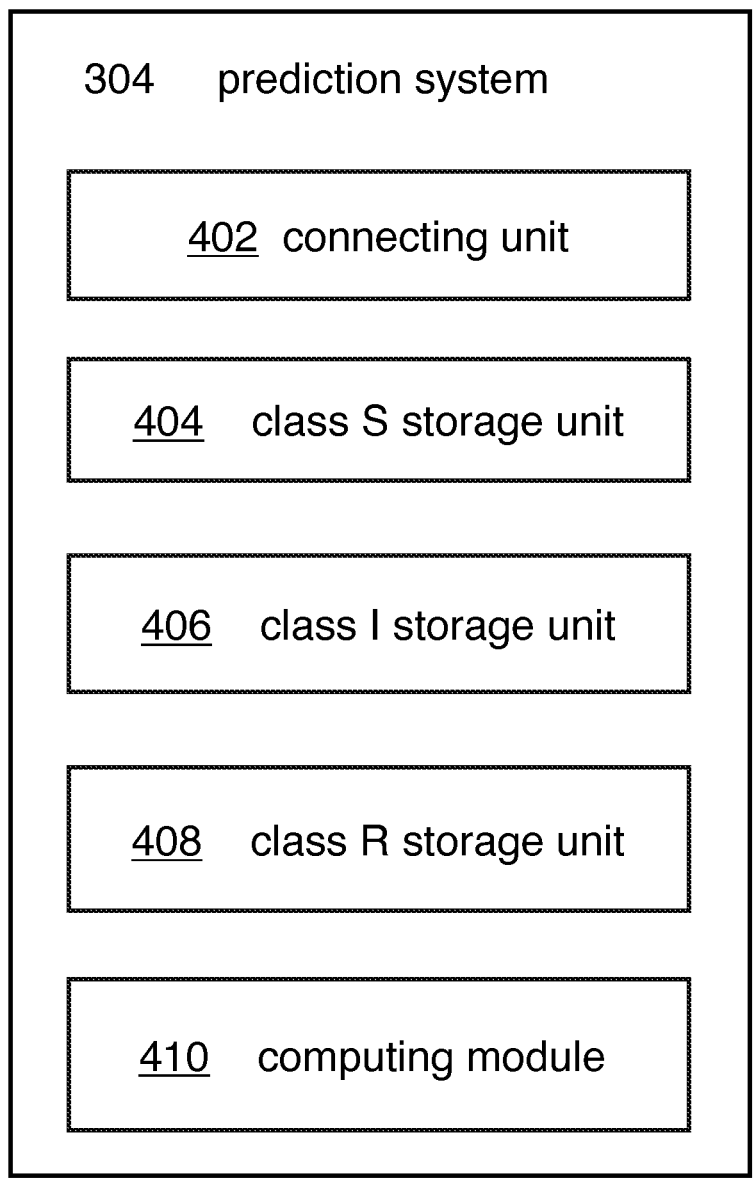
FIG. 4 shows an embodiment of the inventive prediction system.

FIG. 4 shows a block diagram of an embodiment of the prediction system 304 with different components. A prediction system 304 for a prediction of a required number of servers for servers for a future computing workload may comprise a connection unit 402 adapted for connecting a portion of a plurality of servers to each other such that the connected systems may build a computer network in a data center. There may be several storage units:

an S class storage unit 404 adapted for storing a number indicative of the number of class S servers out of the plurality of servers, an I class storage unit 406 adapted for storing a number indicative of the number of class I servers out of the plurality of servers, and an R class storage unit 408 adapted for storing a number indicative of class R servers out of the plurality of servers. The class S servers may be adapted to run and/or deploy an application, the class I servers may actually run and/or deploy the application, and the class R servers may be disconnected from the network. However, they may remain in the data center. Furthermore, the prediction system may comprise a computing module 410 adapted for a computing of a number of servers out of the plurality of servers in each of the classes S, I, and R. A Susceptible-Infected-Recovered-Algorithm based on a deployment rate, an un-deployment rate, and a removing rate may be used. As mentioned above already, the deployment rate may indicate a number of class S servers leaving the class S and move to the class I in a predefined time period, the un-deployment rate may indicate a number of class I servers leaving the class I and move to class S in the predefined time period, and the removing rate may indicate a number of class I servers leaving the class I and move to class R in the predefined time period. As a result, the total number of servers P(t) required in the data center at a future time t may be calculated by the computing module as $P(t)=S(t)+I(t)+R(t)$, wherein S(t) may be the number of servers in class S at time t, I(t) may be the number of servers in class I at time t, and R(t) may be the number of servers in class R at time t, wherein t denotes a point in time after $t_0$. There may be no reason why this inventive concept may not also be applicable to virtual machines as a computing base for an application.

Figure 6:
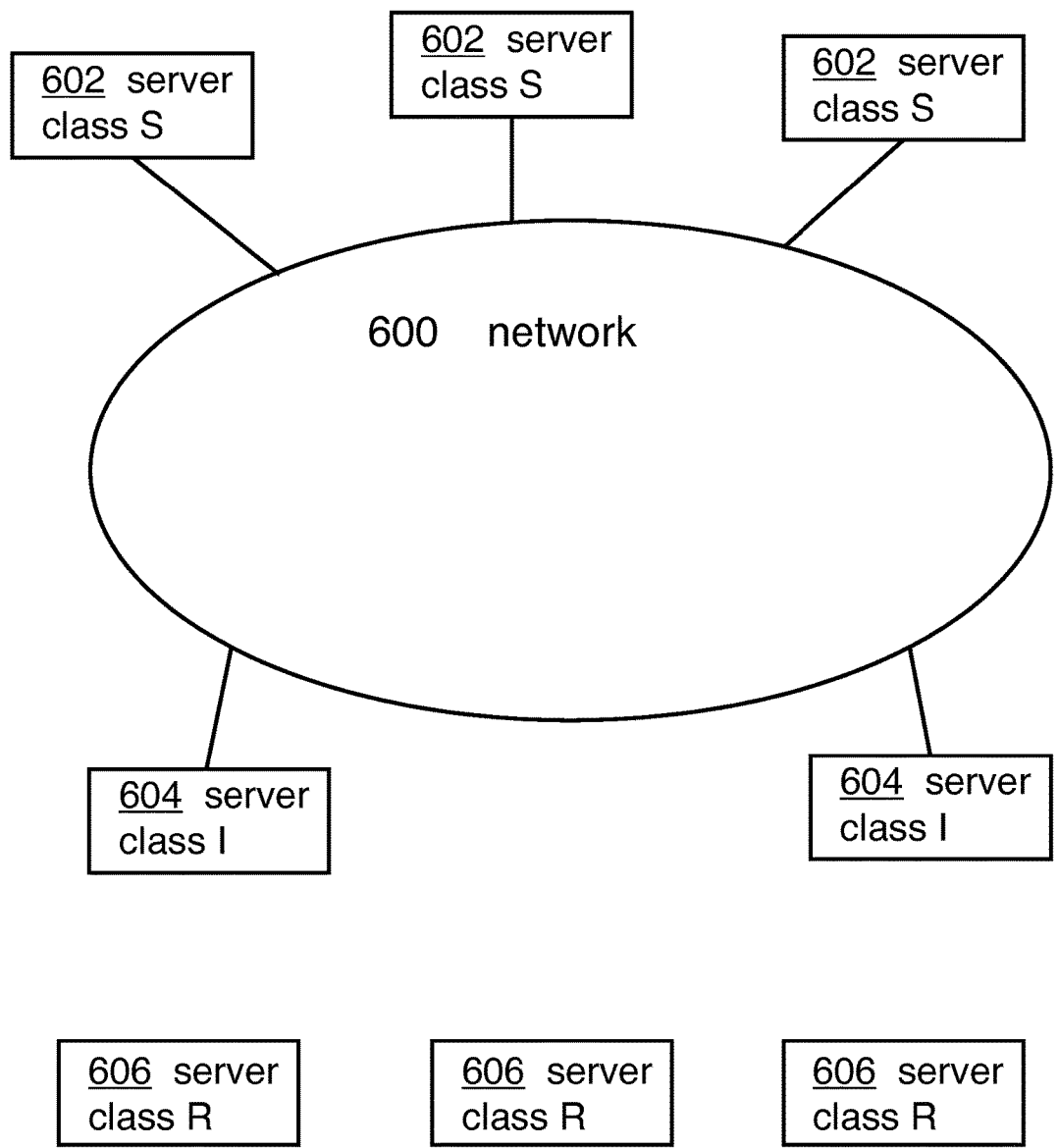
FIG. 6 shows a network topology and servers in class S, I and R.

FIG. 6 shows a network 600 with related topology and servers 602, 604, 606 in classes S, I, and R. S-class and I class servers are active servers and thus, connected to the network 600. R class servers are not connected to the network and thus, generally not able to contribute to the workload computing.

Figure 5:
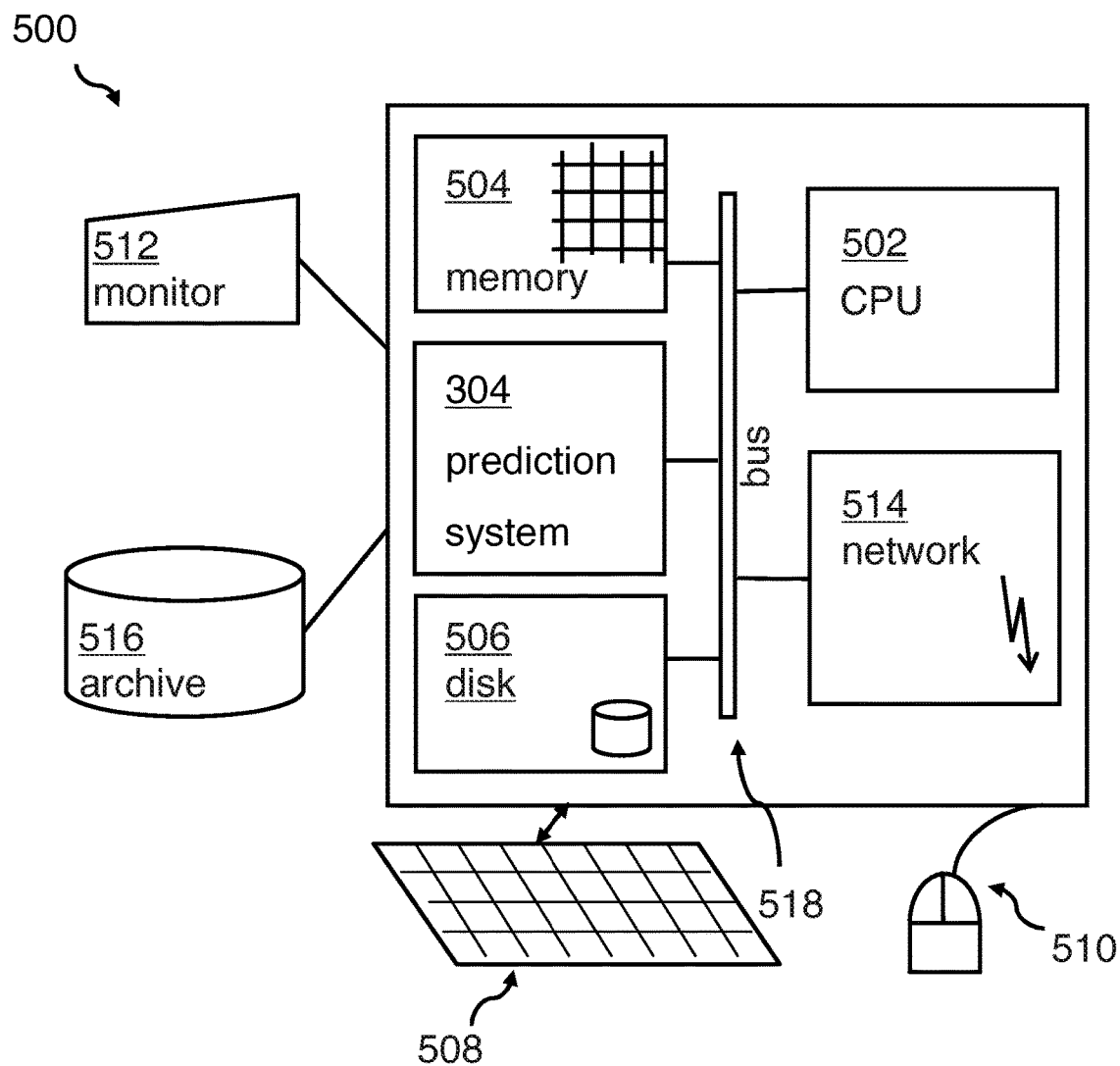
FIG. 5 shows an embodiment of a computing system comprising the prediction system.

Embodiments of the invention may be implemented together with virtually any type of computer, regardless of the platform being suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, a solid-state disk, etc.), and numerous other elements and functionalities, typical of today's computers (not shown).

The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, a prediction system 304 for a prediction of a required number of servers for a future computing workload may be attached or connected to the bus system 518. The prediction system 304 may comprise the components as described in the context of FIG. 4. The computing system 500 may also include input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention. While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks. The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions. The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A computer system for prediction of required number of server computing systems for future computing workload, the computer system comprises:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to connect a portion of a plurality of server computing systems of a data center, wherein the connected plurality of server computing systems are connected within a network;
program instructions to determine at least one class S server computing system of the plurality of server computing systems, wherein the at least one class S server computing system is configured to deploy an application of the plurality of server computing systems;
program instructions to determine at least one class I server computing system of the plurality of server computing systems, wherein the at least one class I server is configured to deploy an application of the plurality of server computing systems;
program instructions to determine at least one class R server computing system of the plurality of server computing systems; and
program instructions to compute at least one server computing system of each of the class I server computing system, class S server computing system, and class R server computing system based on a deployment rate, an undeployment rate, and a removing rate, wherein the deployment rate indicates at least one class S server computing system of the class S server computing systems that is transferred from the class S server computing systems to the class I server computing systems within a predefined time period, wherein the undeployment rate indicates at least one class I server computing system of the class I server computing systems that is transferred from the class I server computing systems to the class S server computing systems within a predefined time period, and wherein the removing rate indicates at least one class I server computing system of the class I server computing systems that is transferred from the class I server computing system to the class R server computing system in a predefined time period.

2. The computer system according to claim 1, wherein the connected plurality of server computing systems within the network are calculated as $P(t)=s(t)+R(t)$, wherein S(t) is the number of server computing systems in class S at time t;

I(t) is the number of server computing systems in class I at time t; and

R(t) is the number of server computing systems in class R at time t.

3. The computer system according to claim 2, wherein at least one server computing system of the at least one class S server computing system, at least one class I server computing system, or the at least one class R server computing system is determined by calculation of at least one of:

S(t) is the number of servers in class S at time t;

I(t) is the number of servers in class I at time t; and

R(t) is the number of servers in class R at time t.

4. The computer system according to claim 1, wherein the deployment rate is based on the connected plurality of server computing systems of the network, and an evolution index indicative of a probability of a demand of the application of the plurality of server computing systems.

5. The computer system according to claim 4, wherein a development of at least one server computing system of the at least one class S server computing system, at least one class I server computing system, or the at least one class R server computing system is calculated according to the following:

$$(d/dt)S(t)=-\lambda(t)*S(t)+\delta(t)*I(t);$$

$$(d/dt)I(t)=\lambda(t)*S(t)+(\gamma(t)+\delta(t))*I(t));\text{ and}$$

$$(d/dt)R(t)=\gamma(t)*I(t);$$

wherein $\lambda(t)$ is the deployment rate;

$\delta(t)$ is the un-deployment rate; and $\gamma(t)$ is the removing rate.

6. The computer system according to claim 5, wherein the deployment rate $\lambda(t)$ is calculated based on $\lambda(t)=c*\Phi(t)*(I(t)/P(t_0))$, and wherein $\lambda(t)=c*\Phi(t)*(I(t)/P(t_0))$ is based on the following:

c is the connection index;

$\Phi$ is the evolution index; and $P(t_0)$ is the total number of servers at time $t_0$.

7. The computer system according to claim 5, wherein the demand of the application of the plurality of server computing systems is based on at least one of the following: workload data from a systems monitoring tool of the plurality of server computing system, user demand data for the application, and an economic index of the server computing system.

8. A computer program product for prediction of required number of server computing systems for future computing workload, the computer program product comprises:
one or more computer-readable tangible storage devices and program instructions stored on at least one of the one or more storage devices, the program instructions comprising:
program instructions to connect a portion of a plurality of server computing systems of a data center, wherein the connected plurality of server computing systems are connected within a network;
program instructions to determine at least one class S server computing system of the plurality of server computing systems, wherein the at least one class S server computing system is configured to deploy an application of the plurality of server computing systems;

program instructions to determine at least one class I server computing system of the plurality of server computing systems, wherein the at least one class I server is configured to deploy an application of the plurality of server computing systems;

program instructions to determine at least one class R server computing system of the plurality of server computing systems; and program instructions to compute at least one server computing system of each of the class I server computing system, class S server computing system, and class R server computing system based on a deployment rate, an undeployment rate, and a removing rate, wherein the deployment rate indicates at least one class S server computing system of the class S server computing systems that is transferred from the class S server computing systems to the class I server computing systems within a predefined time period, wherein the undeployment rate indicates at least one class I server computing system of the class I server computing systems that is transferred from the class I server computing systems to the class S server computing systems within a predefined time period, and wherein the removing rate indicates at least one class I server computing system of the class I server computing systems that is transferred from the class I server computing system to the class R server computing system in a predefined time period.

9. The computer program product according to claim 8, wherein the connected plurality of server computing systems within the network are calculated as P(t)=s(t)+R(t), wherein
S(t) is the number of server computing systems in class S at time t;
I(t) is the number of server computing systems in class I at time t; and
R(t) is the number of server computing systems in class R at time t.

10. The computer program product according to claim 9, wherein at least one server computing system of the at least one class S server computing system, at least one class I server computing system, or the at least one class R server computing system is determined by calculation of at least one of:
S(t) is the number of servers in class S at time t;
I(t) is the number of servers in class I at time t; and
R(t) is the number of servers in class R at time.

11. The computer program product according to claim 8, wherein the deployment rate is based on the connected plurality of server computing systems of the network, and an evolution index indicative of a probability of a demand of the application of the plurality of server computing systems.

12. The computer program product according to claim 11, wherein a development of at least one server computing system of the at least one class S server computing system, at least one class I server computing system, or the at least one class R server computing system is calculated according to the following:

$$(d/dt)S(t) = -\lambda(t)*S(t) + \delta(t)*I(t);$$

$$(d(dt)I(t) = \lambda(t)*S(t) + (\gamma(t) + \delta(t))*I(t)); \text{ and}$$

$$(d/dt)R(t) = \gamma(t)*I(t);$$

wherein
$\lambda(t)$ is the deployment rate;
$\delta(t)$ is the un-deployment rate; and
$\gamma(t)$ is the removing rate.

13. The computer program product according to claim 12, wherein the deployment rate $\lambda(t)$ is calculated based on $\lambda(t)=c*\Phi(t)*(I(t)/P(t_0))$, and wherein $\lambda(t)=c*\Phi(t)*(I(t)/P(t_0))$ is based on the following:
c is the connection index;
$\Phi$ is the evolution index; and
$P(t_0)$ is the total number of servers at time $t_0$.

* * * * *